(12) United States Patent
Tabatabai et al.

(10) Patent No.: US 6,292,967 B1
(45) Date of Patent: Sep. 25, 2001

(54) TMD-DAMPED STAY CABLE AND METHOD AND TMD

(75) Inventors: Habib Tabatabai, Franklin, WI (US); Armin B. Mehrabi, Des Plaines, IL (US)

(73) Assignee: Construction Technology Laboratories, Inc., Skokie, IL (US)

( * ) Notice: Subject to any disclaimer, the term of this patent is extended or adjusted under 35 U.S.C. 154(b) by 0 days.

(21) Appl. No.: 09/395,118

(22) Filed: Sep. 14, 1999

(51) Int. Cl.[7] ................................. F16F 7/10; E01D 11/04
(52) U.S. Cl. ................................. 14/22; 188/380
(58) Field of Search ............................ 14/22; 188/379, 188/380; 267/136

(56) References Cited

U.S. PATENT DOCUMENTS

| | | | |
|---|---|---|---|
| 3,614,291 | 10/1971 | Pullen | 174/42 |
| 3,711,624 | 1/1973 | Dulhunty | 174/42 |
| 4,033,566 | * 7/1977 | Petersen | 267/126 |
| 4,620,059 | 10/1986 | Sherman | 174/42 |
| 4,620,060 | 10/1986 | Perinetti | 174/42 |
| 4,807,840 | 2/1989 | Baker et al. | 248/559 |
| 4,995,583 | 2/1991 | De La Fuente | 248/636 |
| 5,558,191 | 9/1996 | Lai | 188/379 |
| 5,564,536 | 10/1996 | Lai | 188/379 |
| 5,744,708 | 4/1998 | Haeg et al. | 73/146 |
| 5,775,472 | 7/1998 | Osterberg et al. | 188/378 |
| 5,814,963 | 9/1998 | Girard et al. | 318/611 |
| 5,816,373 | 10/1998 | Osterberger et al. | 188/380 |
| 5,857,712 | 1/1999 | Kato | 285/49 |
| 5,873,438 | 2/1999 | Osterberg et al. | 188/379 |
| 5,884,736 | 3/1999 | Burdisso et al. | 188/379 |
| 5,884,892 | 3/1999 | Gassen et al. | 248/635 |
| 5,884,902 | 3/1999 | Hamada et al. | 267/141 |
| 5,906,254 | 5/1999 | Schmidt et al. | 188/378 |
| 5,915,508 | * 6/1999 | Lai | 188/379 |
| 6,102,664 | * 8/2000 | Nguyen | 416/248 |

\* cited by examiner

*Primary Examiner*—William Neuder
(74) *Attorney, Agent, or Firm*—Joan I. Norek; The Law Office of Joan I. Norek

(57) ABSTRACT

Wind-rain induced vibrations of a cable-stayed bridge are damped using tuned mass damper(s) ("TMD"). A TMD-damped cable-stayed bridge is comprised of (a) a bridge having at least one span, at least one pylon, and at least one stay cable extending from a point on the pylon to a point on the span and (b) at least one tuned mass damper in damping communication with the stay cable. A TMD-damped stay cable is comprised of (a) a stay cable comprised of a core of at least one longitudinal element or strand within a tube and (b) a tuned mass damper in damping communication with the stay cable. The TMD can be mounted on the stay cable in a low-profile position relative the stay cable and/or at any desired position along the length of the cable. The TMD can be of annular configuration and comprised of a viscoelastic spring system and an outer mass. The outer mass can be formed of two mating sections.

18 Claims, 4 Drawing Sheets

TMD-DAMPED STAY CABLE AND METHOD AND TMD

BACKGROUND OF THE INVENTION

Incidents of large-amplitude vibrations of stay cables have been reported worldwide when certain combinations of light rain and moderate winds (for instance, ten to fifteen m/s) exist. Stay-cable vibrations having amplitudes on the order of one to two meters have been experienced. This aerodynamic phenomenon is known as "rain-wind induced vibration" (at times referred to as "wind-rain induced vibration" or just "wind-rain vibration") and it is a widespread problem. This problem is believed to have been first identified during the late 1980's to early 1990's time period.

The amplitude of vibration is the maximum degree of vibration (oscillating movement and its repetitions) that will be suffered by a cable. The larger the vibration amplitude and its repetitions, the greater is the adverse effect on fatigue endurance of cables, particularly at their end anchorages.

The cause of these unexpected large-amplitude vibrations (which are believed to be a form of aerodynamic instability) is believed to be the formation of water rivulets on the cables. Such type of large-amplitude vibrations has not been seen in the absence of either the light rain condition or the moderate wind condition. The stay cables are the primary load-carrying members of cable-stayed bridges, and thus they are at least one of the most important and crucial elements of the entire bridge structure. When the stay cables vibrate, the bridge as a whole will generally vibrate. Therefore, rain-wind induced vibration of stay cables can be highly detrimental to the long-term health of stay cables and cable-stayed bridges. The rain-wind induced vibrations that have been experienced were not among the generally anticipated types of cable vibrations such as vortex, galloping and wake galloping. Vibration-induced fatigue stemming from rain-wind induced vibration therefore was also not previously anticipated. Such large-amplitude vibrations can significantly affect the strength and the useful life of the cables, and thus in turn affect the strength and the useful life of the bridge.

Because of (a) the large amplitude of the stay-cable vibration that is induced by rain-wind conditions, (b) the inducement of rain-wind vibration by conditions that are neither rare nor extraordinary, (c) the structural importance of cables to cable-stayed bridges, and (d) the typical vast span of cable-stayed bridges, rain-wind induced vibration of the cables is a source of great concern for the bridge engineering community, and a source of deep public anxiety.

In general, a number of different types of cable vibration control measures have been utilized in cable-stayed bridges. These vibration-control measures include neoprene washers (also known as neoprene rings), cross cables (also known as cross ties or cable ties), hydraulic dampers (also known as external mechanical viscous dampers), and modified polyethylene sheathing. Neoprene washers are a commonly used control measure which, in more detail, are placed in the annular space between the outside diameter of the cable and steel guide pipes near the cable's low and high anchorages, the guide pipes being attached respectively to the bridge deck and to the pylon. The level of cable damping achieved by neoprene washers is highly dependent on the tightness of fit, the level of precompression, and any confinement for the neoprene, and thus their damping contributions are highly variable and not easily predictable. Cross cables transversely connect different stay cables together. Besides introducing cross-cable and tie-connection design and fatigue issues, (1) cross cables negatively impact bridge aesthetics, (2) there has a yet to be established any cross-cable damping contribution of significance, and (3) failures of the cross cables themselves have been experienced. Mechanical viscous dampers rely on reaction of the damper force against the bridge deck, and thus they are generally mounted at the cable's low end, diminishing the level of damping attainable. Polyethylene sheathing, modified to include surface irregularities (protrusions, dimples, spiral strakes) to disrupt the water rivulets, require special fabrication and the effects of such modifications on drag coefficients need particular attention. All of these known measures suffer from one or more drawbacks, including (a) a maximum attainable damping below that desired (does not meet desired performance requirements), (b) a maintenance burden greater than desired, (c) high fabrication costs, (d) high installation costs, particularly in retrofit installations, (e) an abatement of, or detriment to, bridge aesthetic issues, and combinations of these drawbacks.

BRIEF SUMMARY OF THE INVENTION

The present invention is a tuned mass damper ("TMD") for a stay cable, a TMD-damped stay cable and cable-stayed bridge including same, and a method of damping a stay cable employing a TMD.

DETAILED DESCRIPTION OF THE INVENTION

Figure 1:
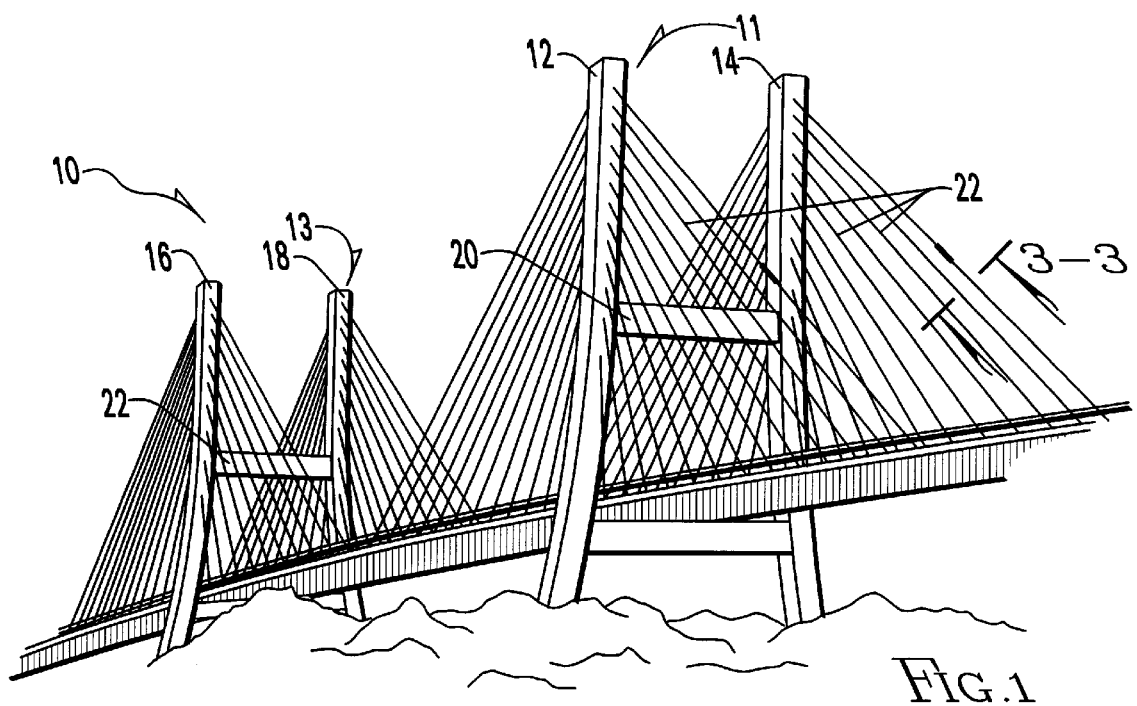
FIG. 1 is a perspective view of a TMD-damped cable-stayed bridge of the invention.
Figure 2:
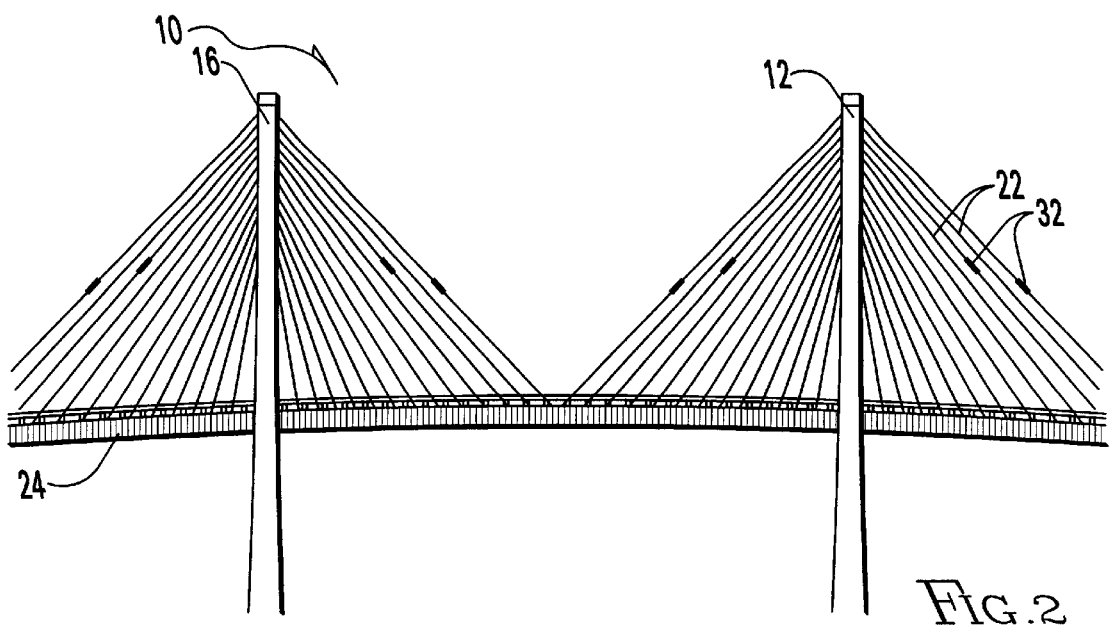
FIG. 2 is a diagrammatic side view of one side of the TMD-damped cable-stayed bridge of FIG. 1.
Figure 3:
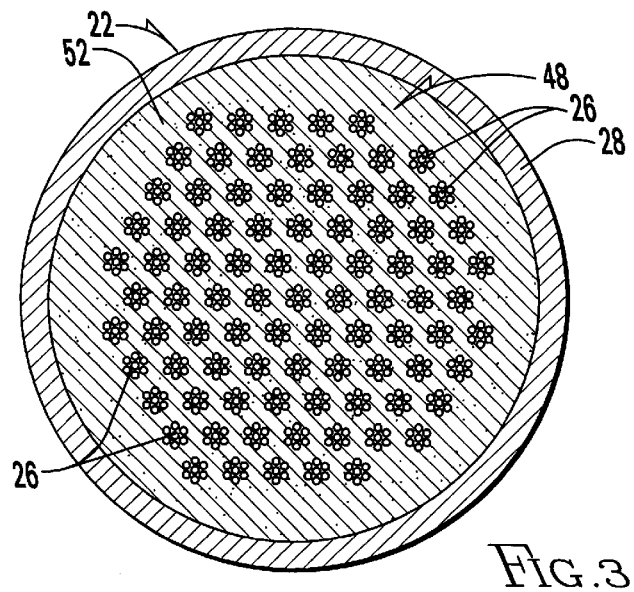
FIG. 3 is a diagrammatic cross-section view of a cable of the TMD-damped cable-stayed bridge of FIG. 1 taken along section line 3—3 of FIG. 1.
Figure 4:
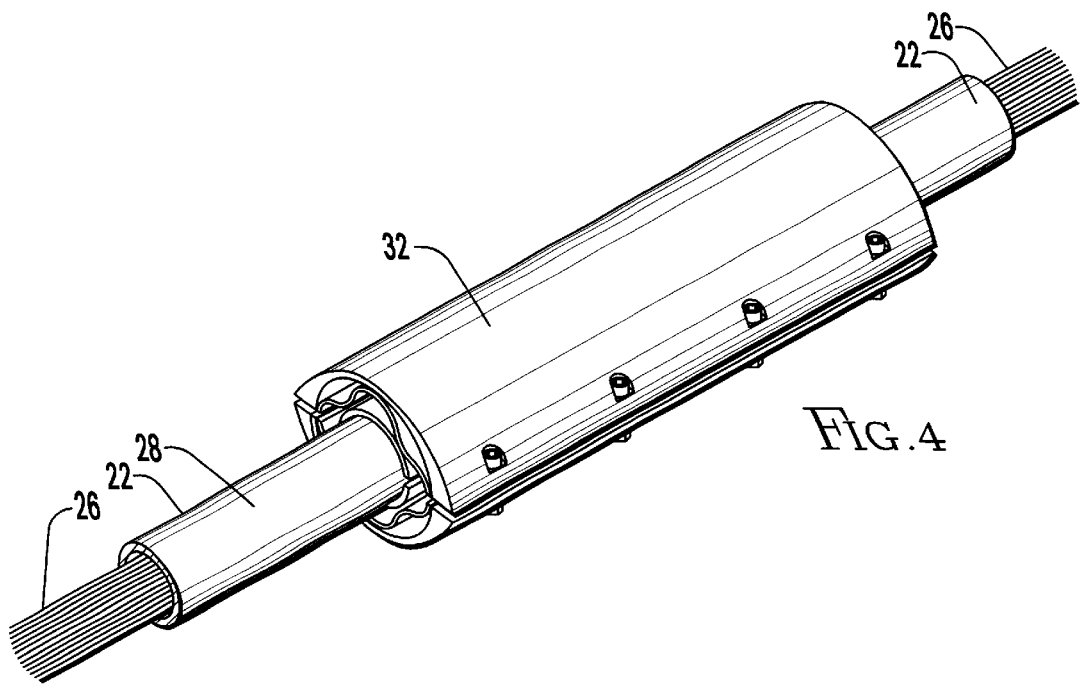
FIG. 4 is a partially diagrammatic perspective view of a TMD and a section of the cable on which it is mounted of the TMD-damped cable-stayed bridge of FIG. 1.
Figure 5:
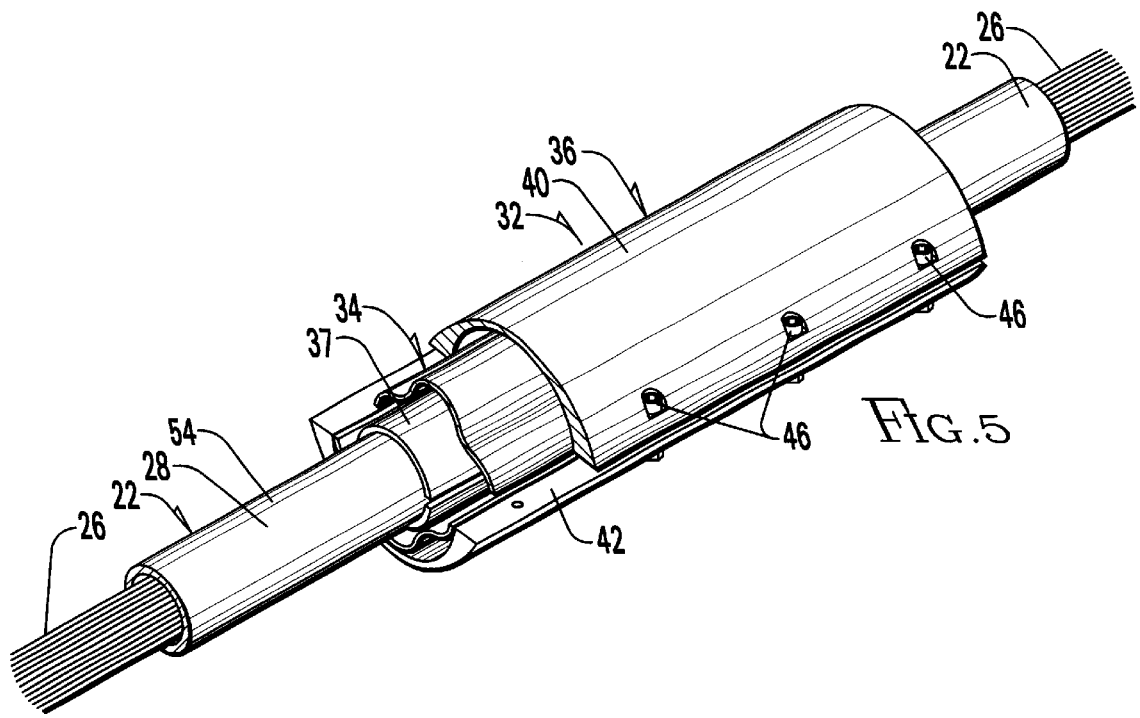
FIG. 5 is a partially diagrammatic section view of a TMD and a section of the cable on which it is mounted of the TMD-damped cable-stayed bridge of FIG. 1, the cable and the TMD being partially cut-away.
Figure 6:
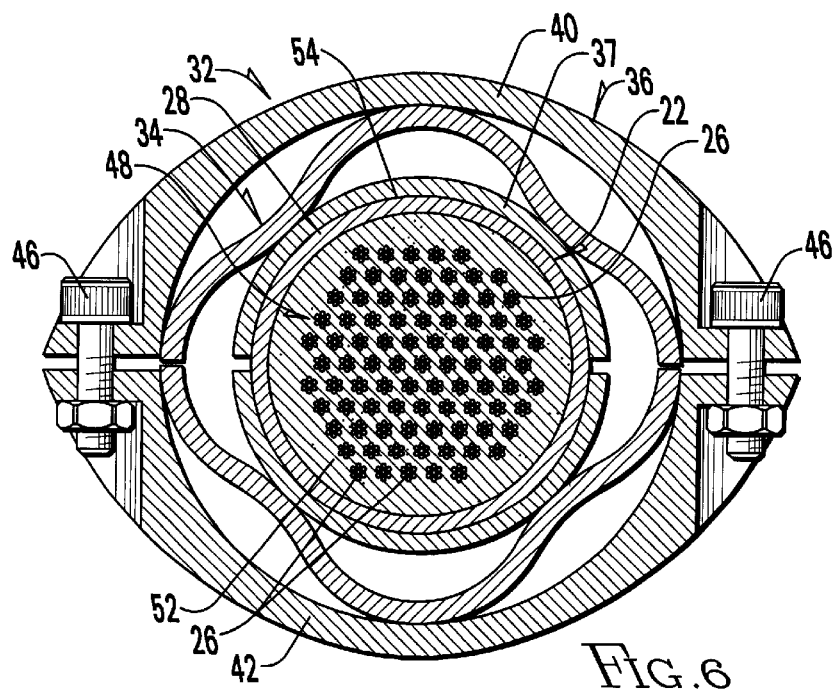
FIG. 6 is a partially diagrammatic cross-section view of a TMD and the encircled cable of the TMD-damped cable-stayed bridge of FIG. 1.

Referring to FIG. 1 through FIG. 6, there is shown a typical span of a twin-pylon, cable stayed bridge, designated by the reference number 10. The bridge 10 as depicted is of the type that might have a main span of up to about 800 or 900 meters. As shown, the bridge 10 has a plurality of two-legged pylons, namely a first two-legged pylon 11 and a second two-legged pylon 13. The first two-legged pylon 11 is comprised of first and second pylon legs 12, 14 bridged by a tie 20. The second two-legged pylon 13 is comprised of third and fourth pylon legs 16, 18 bridged by a tie 22. (Since each leg of the two-legged pylons 11, 13 is itself a column, each two-legged pylon could be described as a pair of pylons bridged by a tie. Single-legged pylons are used at times and of course are not excluded from the present invention.)

There are two planes of stay cables 22 at each two-legged pylon. Each plane of cables is comprised of twenty-four stay cables 22, twelve of which are positioned on each side of the respective pylon leg, forming in combination a semi-harp arrangement of cables. Thus there are a total of ninety-six stay cables 22 on the bridge 10 depicted.

Stay cables generally (except single-strand stay cables) and as depicted are comprised of a bundle of steel strands 26 (also referred to as wires), which forms the core 48, encased or sheathed within a chemical-resistant and moisture resistant outer cover, such as a polyethylene (sometimes steel) pipe or tube 28. A typical strand is a 15.2-mm-diameter, seven-wire strand with a nominal strength of about 1860 MPa. The strands of the stay cables generally can be uncoated, epoxy-coated, or individually greased and coated with polyethylene sheathing. As shown, the strands 26 of the stay cables 22 are uncoated. The outer pipe 28 both bundles the strands 26, holding them together, and protects them from adverse environmental conditions. In U.S. practice, cement group 52 (as shown) is commonly injected into the pipe 28 to provide additional protection for the strands 26.

The stay cables 22 of the bridge 10 as shown might have cables ranging in size from about 25 to about 75 strands, each strand having a cross-section area of about 1.4 cm$^2$ and a nominal strength of about 1.9 MPa, and each cable supporting loads between about 180 and 750 metric tons. The low-strand-count cables normally are mounted so as to extend from a position on the bridge deck 24 close to a pylon to a low position on the pylon, and thus low-strand-count cables support lower loads than high-strand-count cables extending from a more remote position on the bridge deck 24 to a higher position on the pylon. The stay cables 22 are ordered in anchorage position according to length, each cable being shorter than the ones anchored beyond it on the bridge deck and above it on the pylon.

The stay cables 22 are each anchored at both ends, the strands 26 for instance extending beyond the cable pipe 28 and there about locked at anchorage by wedges (in a wedge plate) extending into a group-filled anchorage socket (not shown). Capping and protecting the strands 26 at the anchorage sites are anchor covers (not shown). Generally and as envisioned, the anchor covers are steel drums. The cable wire portions housed within the anchor covers might be heavily coated in a thick grease (not shown) for additional protection, particularly corrosion protection. A given anchor cover generally has a greater diameter than the diameter of the stay cable to which it is secured, producing a cable-profile enlargement at the cable anchorage.

Mounted on some of the stay cables 22 is a tuned mass damper ("TMD") 32 of circular (ring) configuration. Each TMD 32 has viscoelastic spring system 34 and an outer cylinder 36. Each TMD also has an inner ring 37 formed of cushioning material for the practical purpose of eliminating, or at least reducing, any wear of the cable by the action of the spring system 34. The inner ring or interface is not an essential component of the TMD 32 and is not included for a contribution to the TMD's damping function. The outer cylinder 36 is the mass of this tuned mass damper, and is made of steel or any suitable like material. The viscoelastic spring system 34 is disposed between the outer cylinder 36 of the TMD 32 and the external surface 54 of the cable 22 on which it is mounted, and provides a spring-action communication between the outer cylinder 36 and the cable 22 as though it were a mechanical attachment means between the outer cylinder 36 and the cable 22. The two opposed ends of the outer cylinder 36, beyond the length of the viscoelastic spring system 34, can be sealed, for instance with neoprene boots (not shown). Neoprene boots or other suitable sealing means will tightly grip and seal to the outer surface 54 of the cable 22, and thereby protect the internal components of the TMD 32 from environmental conditions.

A TMD generally is a mass (sometimes referred to as a secondary mass) attached to (or otherwise in spring-action communication with) the primary structure or primary mass by a spring with damping or a viscous damped spring. The TMD mass and spring are tuned to the primary-structure vibration frequency of interest. The spring component might be a viscoelastic spring (as shown), which is also referred to as a viscoelastic element. A TMD differs from an "undamped dynamic vibration absorber" in that the spring of the former has a damping or viscoelastic component and the latter does not. Dynamic absorbers function as discrete tuned resonant energy devices while TMD's cover a broader frequency range. A properly tuned absorber changes the original system resonant frequency into two other frequencies and reduces (or eliminates) the response at the original frequency. However, since there is no damping component associated with the spring of an absorber, the response is limited to the target frequency. A TMD, as that terminology is used herein, does not rely on the motion of a liquid within a container, as does a tuned liquid damper, and therefore would not normally include any liquid component. A properly tuned TMD provides a frequency-dependent response, that is, when the primary structure vibrates, the secondary mass responds with a 180° out of phase resonance. The system (mass and spring constant) can be tuned to the cable frequency of interest. As shown, each viscoelastic spring system or element 34 of each TMD 32 depicted is formed of a shape or solid section that provides the desired spring constant. The outer cylinder 36 is a mass that can be, and for each outer cylinder 36 is, tuned to match the frequency of the cable 22 on which it is mounted.

The TMD 32 as shown and in preferred embodiment is sectioned into two mating halves or half-cylinder sections, namely a first section 40 and a second section 42, tightly clamped together and sealed on both sides with conventional mechanical fasteners 46. The separate sections 40, 42 of the TMD 32 can simply be positioned on a cable 22 at the desired mounting point, the cable disposed between the sections 40, 42, and then the sections 40, 42 are clamped together over the cable, and the neoprene boots or other sealing means tightened if necessary. The TMD 32 thus can be readily positioned at any desired point along the length of a cable 22. No lift off is required to retrofit existing, in-use cables. Whether retrofitting existing cables or installing on a new cable, there are no limitations or restrictions on damper placement along the length of a cable—the TMD 32 can readily be installed at the point deemed desirable. In addition, the TMD 32 can easily be removed (which is particularly advantageous when damping is desired only for a temporary period), and its position along the length of a cable can easily be changed when desired. Under most circumstances, changing the position of the TMD 32 along the length of a cable won't even require TMD-removal; instead the mechanical fasteners 46 holding the sections 40, 42 need only be loosened, and then the TMD 32 can be slid along a cable to a new spot.

The TMD 32 as depicted and in preferred embodiment has a low profile. It blends with or even augments the aesthetically-pleasing array of cables fanned out to the side(s) of a pylon. The TMD 32 as depicted and in preferred embodiment, unlike cross ties (cross cables), hydraulic dampers and other conventional damping measures, is aesthetically unobtrusive, and does not negatively impact the streamlined look of a cable-stayed bridge.

In contrast, existing hydraulic or viscoclastic dampers must be located at or near cable ends where they are least effective. For instance, neoprene washers (rings) can only be installed at the anchor ends of cables, the lowest-performance position. The retrofitting of a cable-stayed bridge such as the bridge 10 depicted with neoprene washers could easily take months and require a number of outside skilled workers and heavy equipment, easily mounting a $5,000 per cable cost. The retrofit installation of a TMD as depicted and in preferred embodiment would require between 15 and 20 minutes of a municipality's own bridge maintenance employee's time, and a plurality of cables can be retrofitted simultaneously, resulting in a significant reduction in installation cost and shutdown time. A couple of workers could retrofit all 96 cable of the bridge 10 depicted in far less than a week's time. Cross cables (cross ties) are a low-performance expedient which, running counter to the line of the cables, diminishes the appearance of the array of cables, for instance such as the semi-harp array depicted. In addition, avoidance of a liquid (hydraulic) damping media should result in reduced maintenance costs.

EXAMPLE 1 AND COMPARATIVE EXAMPLE A

Figure 7:
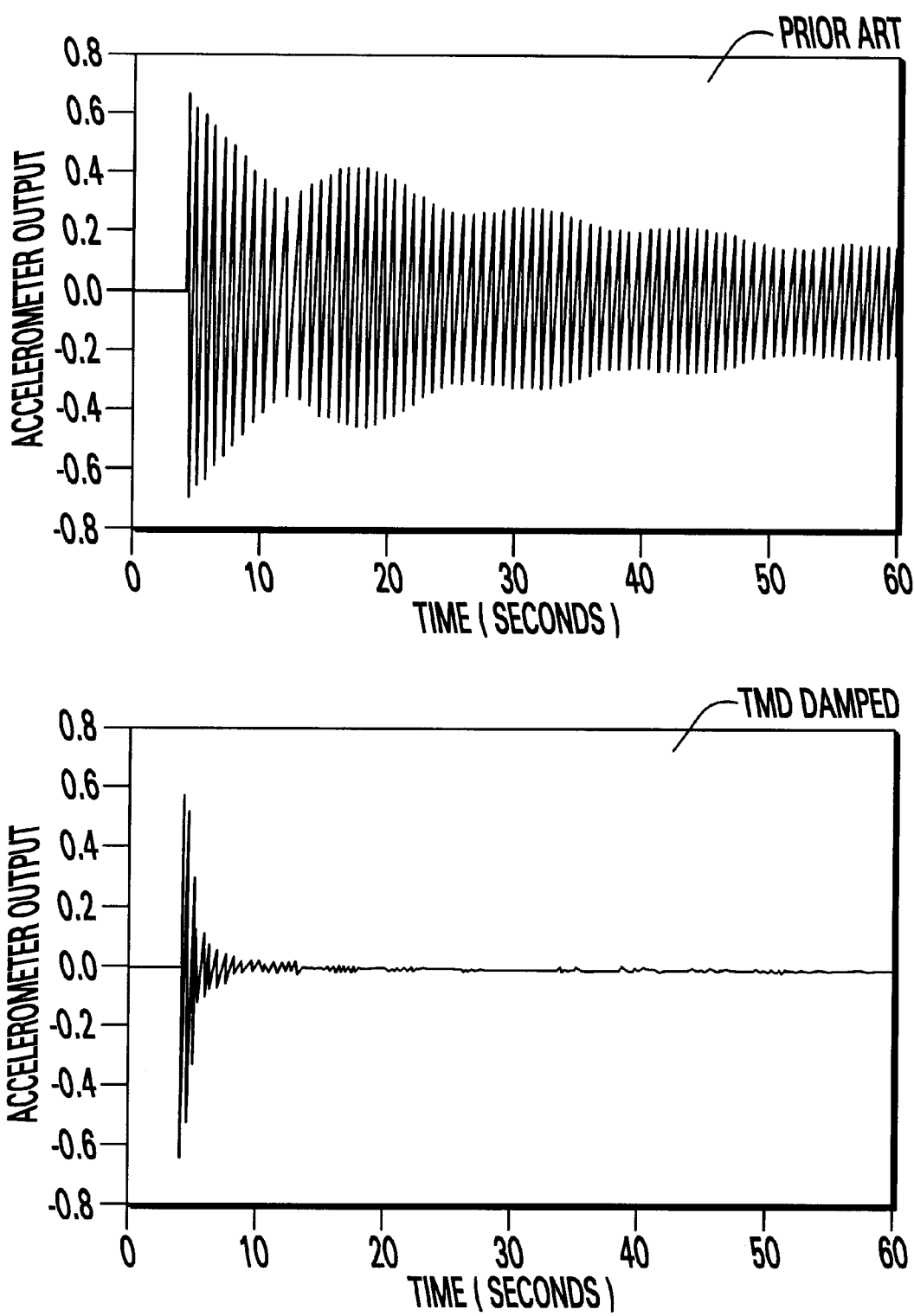
FIG. 7 is a graphical comparison of the degree of vibrations versus time between an undamped model cable and the same cable with TMD damping of the present invention.

The effectiveness of a TMD was assessed using a 1/7th scale stay cable model and appropriately-scaled auxiliary equipment. The materials used are the same or very similar to that of a fill-scale prototype, and thus dynamic scaling relationships indicate that the damping ratios of the model and a full-scale prototype will be the same or very close to the same. Measurement of damping was performed using the free vibration decay method. An accelerometer was attached to the cable at about mid-length. The cable was deflected at mid-span using a weight hung from the cable by a string, and then suddenly cutting the string to excite the first mode vibration of the cable. The initial and subsequent cable vibrations, in terms of accelerometer output (volts) versus time, were recorded using a high-speed data acquisition system. A "reference" cable, that is a model cable filled with a conventional cement group and not equipped with any type of damper, was shown by this test method to have a very low damping ratio of 0.05%. As Comparative Example A, scaled neoprene ring models were installed inside scaled guide pipes at both ends of the reference cable and a damping ratio attained reached as high as 0.4 to 0.61%. While such damping is considered generally significant, it is below the threshold of rain-wind vulnerability. A TMD system was modeled by hanging different masses at various locations along the cable, namely distances of 10, 20, 30, 40 and 50 percent of the cable length from one end, using springs, Spring Nos. 1 to 5, with spring factors ranging from 0.44 to 5.3 kN/m (spring stiffness or nominal spring constants in lbs/inch of 3, 8, 16 and 30). (These springs are equivalent to full-scale prototype springs of spring constants of 17.5, 21.0, 56.0, 112.0 and 210.0 lbs/inch respectively.) Spring No. 1 was tested uncoated and coated with a polyurethane compound to add damping element. Spring No. 1 was an extension spring while the other springs were compression springs. In general, the tuned mass dampers improved cable damping within a wide range of mass proportions and spring factors. Moreover, at each attachment location along the length of the cable a combination of mass and spring factor was identified as providing optimum damping. In FIG. 7 there is shown for comparison the time-domain responses of the model cable without and with a TMD. The latter achieved a damping ratio of 2.35%. That TMD was comprised of an uncoated tension Spring No. 1 (spring factor of 0.44 kN/m) with a mass of 1020 grams or approximately 3% of the total model cable mass located at 20% of the cable length from one end, on the reference cable (Cable 1).

In more detail regarding Example 1 and Comparative Example A, the length of cables employed in the tests was about 45 feet. The cables each consisted of one 0.6-inch diameter, 7-wire strand encased in a continuous high-density polyethylene pipe with an outside diameter of 1.315 inches and a minimum wall thickness of 0.12 inch (SDR ratio of 11), and stressed to 23,4000 lbs or 40% of its nominal capacity (after losses). This stress level in the cable is typical under dead load conditions in stay cables. A five foot length of this type of cable, before grouting, weighed 3,406.7 grams, and thus this type of cable had a unit-length weight of 2.235 kg/m. Cable 1 was grouted with a conventional mixture comprised of 85.6 lb. Masterflow® 816 brand cementitious cable grout (a Portland cement-based grout commercially available from Master Builder, Inc. of Cleveland, Ohio) and 28.2 water. Cable 2 was grouted with a latex-modified cement grout, the mixture consisting of 85.6 lb. Masterflow® 816 cable grout, 28.7 lbs of Acryl-Set liquid (latex) polymer and 19.1 lbs of water (Acryl-Set liquid polymer also being commercially available from Master Builder, Inc. of Cleveland, Ohio). The volume of such type of filler in stay cables is generally 2 to 3 times larger than the volume of steel. The scaled neoprene ring models were fitted tightly inside a scaled guide pipe and attached to the reaction frame (anchorage) of the stay cable model. The scaled neoprene ring models were cut from 1-inch-thick sheet of Durometer 50 neoprene to fit the inside of the pipe at a distance of 0.5 inch from the free end, which would be equivalent to a 7-inch-thick neoprene ring located 3.5 inches from the free end of the guide pipe in a full-scale prototype. The guide pipes were 12-inch long, 2.25 inch outside diameter, polyethylene pipes having a 0.065 inch wall thickness, which is consistent with actual neoprene-ring guide pipes used conventionally on cables of bridges such as the bridge 10 depicted above, as scaled down by a factor of 7 (the 1/7th scale of the cable model).

The geometric force parameters for cables of cable-stayed bridges typically fall within the ranges set forth in Table 2 below.

TABLE 2

|  | Min. | Max. | Mean | |
|---|---|---|---|---|
| Chord Length (L) in meters (m) | 12 | 460.1 | 128 | |
| Inclination Angle (from the horizontal) in degree | 19 | 82 | 3 | 8 |
| Outside Diameter (D) in meters (m) | 0.056 | 0.280 | 0.182 | |
| Tension Force (T) in kilo-Newtons (kN) | 550 | 10,549 | 4,513 | |
| Mass Unit length (m) in kilograms per meter (kg/m) | 17 | 217 | 94 | |

The criterion for control of rain-wind vibrations, expressed as the dimensionless mass-damping parameter or Scruton number ("Sc"), is proportional to both the cable mass per unit length and the damping ratio and inversely proportional to the density of the air and the square of the cable's outer diameter. An Sc greater than 10 is reported and believed necessary to avoid rain-wind vibrations. A reported database of parameters of stay cables from fifteen cable-stayed bridges around the world revealed that the mean and standard deviation of the damping ratio values required to achieve an Sc greater than 10 were 0.454% and 0.107% respectively. The reported measured damping ratios of stay cables vary widely between 0.05% and 0.5%. A very large proportion of stay cables around the world would not meet the requirement of a Scruton number greater than 10, and therefore may be susceptible to rain-wind induced vibrations. On the other hand, it is believed that a damping ratio of about 0.5% or 0.7% of critical damping would be sufficient to meet the Sc-greater-than-10 criterion for over 90% of the cables in the above-described database.

For the control of inclined cable galloping vibrations, a reported recommendation indicates that the critical wind speed is proportion to the frequency of the cable, the cable outer diameter and the square root of Sc. As cable damping increases, Sc increases and thus the critical wind factor increases. Increasing damping will increase the wind required to induce galloping vibrations.

Vibrations seen in stay-cables include vortex excitation (isolated cable or groups of cables), rain-wind induced vibrations (alone accounting for 90% of the incidents of excessive vibrations), inclined cable galloping, wake galloping of groups of cables, galloping of ice-coated cable and aerodynamic excitation of overall bridge modes.

In preferred embodiment, the actual frequency of any existing cable is measured in the field before fabricating a TMD for it. The TMD would be designed so that its frequency is close to that of the cable mode(s) whose vibration suppression is desired. Preferred annular TMD's are active in all directions.

The TMD's can be installed at any location along the length of a stay cable. Maximum achievable damping is generally highest at cable mid-length, although proper installations at about 10% or about 20% of the cable's length can also achieve sufficient damping improvements that meet or exceed the threshold of rain-wind vulnerability.

The present invention does not exclude the mounting of two or even more TIMD's on a single stay cable, although under normal circumstances there probably is no practical reason for such multiple dampers.

A cable-stayed bridge is a cable-supported bridge. Cable-stayed bridges typically have a span (a) at least of about 40 or 50 meters and (b) up to about 900 meters. The world's longest cable-stayed bridge span to date is believed to be about 890 meters. The stay cables are mounted at inclines, running from the bridge deck area up to points along the vertical extent of pylons. Pylons of cable-stayed bridges are columns to which the high end of the stay cables are anchored. Cables can be (but are not necessarily) anchored at opposed sides of a given pylon. The stay cables support a span of the bridge and also exert opposed axial forces (tension) upon the pylons, stiffening and supporting the pylons. Most pylons are formed of concrete, although more flexible steel pylons (at times called towers) are known. Pylons are typically between 50 and 200 meters high, although steel pylons as high as 300 meters are known.

In broad embodiment, the configuration of the TMD of the present invention need not be the viscoelastic element and encircling cylindrical mass combination described above in preferred embodiment. The TMD may instead be a spring-mass type of TMD of other configurations, or a pendulum type of TMD, or a circular-track type of TMD, and the like.

Viscoelastic ("V.E.") materials are materials that are both viscous and elastic, and are typically polymers, such as for instance polyurethane. V.E. element damping involves the dissipation of energy due to relaxation and recovery of polymer network after deformation. Properties of V.E. are dependent on frequency and temperature effects.

The present invention in broad embodiment is a TMD-damped cable-stayed bridge comprising: (a) a bridge having at least one span, at least one pylon, and at least one stay cable extending from a point on the pylon to a point on the span; and (b) at least one tuned mass damper in damping communication with the stay cable. In preferred embodiments, the bridge's pylon has (a) a plurality of the stay cables each separately extending from a point on a first side the pylon to a point on the span and (b) a plurality of stay cables each separately extending from a point on a second side the pylon to a point on the span. The stay cables might lie in substantially the same plane, and in some cable-stayed bridges will together form a semi-harp array.

The present invention in broad embodiment also is a TMD-damped stay cable comprising: (a) a stay cable comprised of a core of at least one longitudinal element or strand within a tube; and (b) a tuned mass damper in damping communication with the stay cable. Typically the tube will have an outside diameter of at least about 2, 3 or 4 inches, and the outside diameter of course can be significantly greater than that.

The present invention in broad embodiment also is a method of damping a stay cable comprising the step of bringing a tuned mass damper into damping communication with a stay cable. The tuned mass damper is preferably mounted on the stay cable in a low-profile position relative the stay cable. The tuned mass damper is preferably mounted on the stay cable at a position where its damping performance includes adding on an additional damping ratio of at least about 0.5% or about 0.7% to the natural damping ratio of the stay cable on which it is mounted. When the tuned mass damper is of annular configuration and is comprised of a viscoelastic spring system and an outer mass, and the outer mass is formed of two mating sections, the tuned mass damper is preferably mounted on the stay cable by (a) sandwiching the cable between the two mating sections whereby the viscoelastic spring system is disposed between the outer mass and the external surface of the stay cable, and then (b) fastening the two mating sections of the outer mass together about the stay cable.

The present invention in broad embodiment also is a tuned mass damper for a stay cable comprising a viscoelastic spring system of annular cross section configuration and an outer mass, the viscoelastic spring system being in spring-action communication with the outer mass.

In preferred embodiments of the present invention, the tuned mass damper is mounted on, in damping communication with, the stay cable. The tuned mass damper preferably has a low profile relative the stay cable on which it is mounted. The tuned mass damper is preferably of annular configuration and is comprised of an annular viscoelastic spring system and an outer mass. Such an annular viscoelastic spring system is disposed between the outer mass and an the external surface the stay cable and provides a spring-action communication between the outer cylinder and the cable. The viscoelastic spring system is preferably a continuous viscoelastic spring system. The outer mass in some preferred embodiments is a cylinder formed of two mating half-cylinder sections.

In some of the preferred embodiments, the tuned mass damper adds on an additional damping ratio of at least about 0.5% or 0.7% to the natural damping ratio of the cable on which it is mounted or otherwise in damping communication with.

The stay cables might be comprised of a single strand or instead comprised of a bundle of strands, such as steel strands, within a tube or pipe. At times each of the stay cable support a load of at least about 100 metric tons.

In other preferred embodiments the tuned mass damper is mounted on a stay cable at a position between about 10%, or 15%, and about 50% of the length of the stay cable relative one of the two ends of the stay cable.

It is well within the skill of a person in the technical field, upon becoming conversant with, or otherwise having knowledge of, the present invention, to select suitable combinations of TMD components and configurations and the like in view of the type of TMD being designed and/or constructed.

The above described embodiments are exemplitive, and the terminology is employed for illustration purposes and not limitation purposes. The present invention is not limited to the combinations and subcombinations illustrated herein.

We claim:

1. A tuned mass damper-damped cable-stayed bridge comprising:
   a bridge having at least one span, at least one pylon, and at least one stay cable extending from a point on said pylon to a point on said span; and
   at least one tuned mass damper in damping communication with said stay cable,
   wherein said stay cable is comprised of a bundle of steel strands within a pipe, each of said stay cable supporting loads of at least about 100 metric tons.

2. The tuned mass damper-damped cable-stayed bridge of claim 1 wherein;
   said pylon has a plurality of said stay cables each separately extending from a point on a first side said pylon to a point on said span;
   said pylon has a plurality of stay cables each separately extending from a point on a second side said pylon to a point on said span;
   wherein said tuned mass damper is mounted on, in damping communication with, one of said stay cables; and
   said tuned mass damper has a low profile relative said stay cable on which it is mounted.

3. The tuned mass damper-damped cable-stayed bridge of claim 1 wherein said tuned mass damper adds on an additional damping ratio of at least about 0.7% to the natural damping ratio of said cable on which it is mounted.

4. The tuned mass damper-damped cable-stayed bridge of claim 1 wherein said tuned mass damper adds on an additional damping ratio of at least about 0.5% to the natural damping ratio of said stay cable.

5. The tuned mass damper-damped cable-stayed bridge of claim 1 wherein said tuned mass damper is mounted on said stay cable at a position between about 10% and 50% of the length of said stay cable relative one of the two ends of said stay cable.

6. The tuned mass damper-damped cable-stayed bridge of claim 1 wherein said tuned mass damper is of annular configuration and is comprised of a viscoelastic spring system and an outer mass,
   wherein said viscoelastic spring system is disposed between said outer mass and the external surface said stay cable and provides a spring-action communication between said outer mass and said stay cable.

7. A tuned mass damper-damped stay cable comprising:
   a stay cable comprised of a core of a longitudinal element within a tube; and
   a tuned mass damper in damping communication with said stay cable,
   wherein said stay cable is comprised of a bundle of steel strands within a pipe, capable of supporting dead loads of at least about 100 metric tons.

8. The tuned mass damper-damped stay cable of claim 7 wherein said tuned mass damper is mounted on said stay cable and has a low profile relative said stay cable.

9. The tuned mass damper-damped stay cable of claim 7 wherein said tuned mass damper adds on an additional damping ratio of at least about 0.5% to the natural damping ratio of said stay cable on which it is mounted.

10. The tuned mass damper-damped stay cable of claim 7 wherein said tuned mass damper adds on an additional damping ratio of at least about 0.7% to the natural damping ratio of said stay cable.

11. The tuned mass damper-damped stay cable of claim 7 wherein said tuned mass damper is mounted on said stay cable at a position between about 10% and 50% of the length of said stay cable relative one of the two ends of said stay cable.

12. The tuned mass damper-damped stay cable of claim 7 wherein said tuned mass damper is of annular configuration and is comprised of a viscoelastic spring system and an outer mass,
    wherein said viscoelastic spring system is disposed between said outer mass and the external surface said stay cable and provides spring-action communication between said outer mass and said stay cable.

13. A method of damping a stay cable comprising the step of:
    bringing a tuned mass damper into damping communication with a stay cable, wherein said stay cable is comprised of a bundle of steel strands within a pipe, capable of supporting dead loads of at least about 100 metric tons.

14. The method of damping a stay cable of claim 13 wherein said tuned mass damper is mounted on said stay cable in a low-profile position relative said stay cable.

15. The method of damping a stay cable of claim 13 wherein said tuned mass damper is mounted on said stay cable at a position where its damping performance includes adding on an additional damping ratio of at least about 0.5% to the natural damping ratio of said stay cable on which it is mounted.

16. The method of damping a stay cable of claim 13 wherein said tuned mass damper is mounted on said stay cable at a position at which it adds on an additional damping ratio of at least about 0.7% to the natural damping ratio of said stay cable.

17. The method of damping a stay cable of claim 13 wherein said tuned mass damper is mounted on said stay cable at a position between about 10% and 50% of the length of said stay cable relative one of the two ends of said stay cable.

18. The method of damping a stay cable of claim 13 wherein said tuned mass damper is of annular configuration and is comprised of a viscoelastic spring system and an outer mass, said outer mass being formed of two mating sections
    wherein said tuned mass damper is mounted on said stay cable by sandwiching said cable between said two mating sections, said viscoclastic spring system being thereby disposed between said outer mass and the external surface of said stay cable, and
    then fastening said two mating sections of said outer mass together about said stay cable.

* * * * *